(12) United States Patent
Milot

(10) Patent No.: US 7,894,955 B2
(45) Date of Patent: *Feb. 22, 2011

(54) METHOD AND APPARATUS FOR VEHICLE ROLLOVER MITIGATION

(75) Inventor: Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 389 days.

This patent is subject to a terminal disclaimer.

(21) Appl. No.: 10/593,735

(22) PCT Filed: Mar. 23, 2005

(86) PCT No.: PCT/US2005/010014

§ 371 (c)(1),
(2), (4) Date: Jul. 9, 2008

(87) PCT Pub. No.: WO2005/095133

PCT Pub. Date: Oct. 13, 2005

(65) Prior Publication Data

US 2008/0281487 A1    Nov. 13, 2008

Related U.S. Application Data

(60) Provisional application No. 60/555,480, filed on Mar. 23, 2004.

(51) Int. Cl.
*B60G 17/00* (2006.01)

(52) U.S. Cl. ............................. 701/38; 701/37; 701/45; 280/5.5; 280/5.501; 280/5.502

(58) Field of Classification Search ............... 701/1, 701/36, 37, 38, 39, 45; 280/5.501, 5.502, 280/5.506; 180/197

See application file for complete search history.

(56) References Cited

U.S. PATENT DOCUMENTS

| 5,749,984 A | 5/1998 | Frey et al. |
| 6,282,474 B1 | 8/2001 | Chou et al. |
| 6,542,073 B2 * | 4/2003 | Yeh et al. ................. 340/440 |

(Continued)

FOREIGN PATENT DOCUMENTS

EP    1 386 802 A1    2/2004

(Continued)

OTHER PUBLICATIONS

Office Action in Japanese Patent Application No. 2007-505,219.

*Primary Examiner*—Thomas G Black
*Assistant Examiner*—Peter D Nolan
(74) *Attorney, Agent, or Firm*—MacMillan, Sobanski & Todd, LLC

(57) ABSTRACT

A method is provided for detecting a rollover event of a vehicle. A lateral kinetic energy of the vehicle is determined in response to vehicle longitudinal velocity and vehicle side slip angle. A lateral acceleration of the vehicle is measured. A tire normal force is measured. A rollover potentiality index is determined in response to the lateral kinetic energy and the lateral acceleration. A rollover index is determined by weighting the rollover potentiality index by a factor of the lateral acceleration and by a factor of the tire normal force. A comparison is made to determine if the rollover index is above a predetermined threshold.

8 Claims, 6 Drawing Sheets

U.S. PATENT DOCUMENTS

| | | | |
|---|---|---|---|
| 7,057,503 B2 * | 6/2006 | Watson | 340/440 |
| 7,165,008 B2 * | 1/2007 | Choi | 702/141 |
| 7,404,317 B2 * | 7/2008 | Mancosu et al. | 73/146 |
| 2002/0056582 A1 | 5/2002 | Chubb et al. | |
| 2003/0055549 A1 * | 3/2003 | Barta et al. | 701/70 |
| 2003/0058118 A1 * | 3/2003 | Wilson | 340/679 |
| 2003/0158633 A1 | 8/2003 | Schubert | |
| 2003/0182042 A1 | 9/2003 | Watson et al. | |
| 2003/0212482 A1 | 11/2003 | Lu et al. | |
| 2005/0033549 A1 * | 2/2005 | Clark | 702/150 |

FOREIGN PATENT DOCUMENTS

| | | |
|---|---|---|
| JP | 10100736 | 4/1998 |
| JP | 2000296706 | 10/2000 |
| JP | 2001071844 | 3/2001 |
| JP | 2002356120 | 12/2002 |
| WO | WO 03/081180 A2 | 10/2003 |

* cited by examiner

METHOD AND APPARATUS FOR VEHICLE ROLLOVER MITIGATION

CROSS-REFERENCE TO RELATED APPLICATIONS

This application is the U.S. national phase of International Application No. PCT/US2005/010014, filed Mar. 23, 2005, which claims priority from U.S. patent application Ser. No. 60/555,480, filed Mar. 23, 2004. The disclosures of both applications are incorporated herein by reference.

BACKGROUND OF THE INVENTION

The present invention relates in general to a method for estimating the propensity of a vehicle to rollover, and more specifically, to a method for detecting an approach to a rollover event of a vehicle and providing a corrective action to reduce the likelihood of an actual rollover.

Dynamic stability control systems have been implemented in vehicles to deter a vehicle from actually rolling over. Vehicle rollovers have become a growing concern for vehicles with a high center of gravity and especially those used for multiple purposes in different geographical locations. A vehicle may have the potential to rollover due to forces exerted on the vehicle under different types of operating conditions. Methods have been used to anticipate when the vehicle has the propensity to rollover and to make adjustments to counteract vehicles having that propensity from rolling over.

A rollover event, as used in this application, is defined as a moment when current vehicle operating conditions (e.g., speed, steering angle, lateral acceleration, etc.) approach a threshold where the rollover could actually occur. Typically, stability control systems detect or estimate the propensity for a rollover event to occur by measuring a roll angle or a roll rate. This requires a dedicated sensor for determining the roll angle at each instance the vehicle is in travel. Sensors are costly and require dedicated wiring and packaging locations. Vehicle manufacturers are consistently looking for reliable methods which can obtain the same results yet cost less and minimize the number of components on the vehicle.

It is also known to use differential braking to induce understeer and limit lateral acceleration. Such methods include electronic stability control and active roll management. These systems typically detect critical lateral acceleration, wheel lift detection, vehicle roll rate (roll angle), and roll energy. Suspension based systems use active roll control and active damper controls. Steering based systems typically use active front steer (steering angle overlay) and four wheel steering (active rear steer) to control tire lift from occurring. Each of these methods typically use vehicle inertial based sensors.

Another method for detecting a rollover event of a vehicle and providing a corrective action to reduce the likelihood of an actual rollover is described in pending U.S. patent application Ser. No. 10/719,968 filed Nov. 21, 2003 (hereinafter referred to as the '968 application), the disclosures of which are incorporated herein by reference. The invention disclosed provides a method for detecting a rollover event of a vehicle and providing a corrective action to counteract an actual rollover by using lateral kinetic energy and lateral acceleration of the vehicle to detect the rollover propensity. In one aspect of the invention, a method is provided for detecting a rollover propensity of a vehicle. A lateral kinetic energy of the vehicle is determined in response to vehicle longitudinal velocity and vehicle side slip angle. A lateral acceleration of the vehicle is then measured. A rollover potentiality index is determined in response to the lateral kinetic energy and the lateral acceleration. A rollover index is determined by weighting the rollover potentiality index by a factor of the lateral acceleration. A comparison is made to determine if the rollover index is above a predetermined threshold.

Various objects and advantages of this invention will become apparent to those skilled in the art from the following detailed description of the preferred embodiment, when read in-light of the accompanying drawings.

SUMMARY OF THE INVENTION

The present invention provides a method for detecting a rollover event of a vehicle and providing a corrective action to counteract an actual rollover based on lateral kinetic energy and lateral acceleration of the vehicle.

In one aspect of the invention, a method is provided for detecting a rollover event of a vehicle. A lateral kinetic energy of the vehicle is determined in response to vehicle longitudinal velocity and vehicle side slip angle. A lateral acceleration of the vehicle is measured. A rollover potentiality index is determined in response to the lateral kinetic energy and the lateral acceleration. A rollover index is determined by weighting the rollover potentiality index by a factor of the lateral acceleration and by a factor of tire normal forces. A comparison is made to determine if the rollover index is above a predetermined threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The method for estimating a propensity of a vehicle to rollover, according to the '968 application, includes the steps of determining a lateral kinetic energy of the vehicle in response to vehicle longitudinal velocity and vehicle side slip angle, measuring a lateral acceleration of the vehicle, and determining a rollover potentiality index in response to the lateral kinetic energy and the lateral acceleration.

The method according to the present invention adds an additional factor that allows for better estimation of the potential for a wheel lift event thereby allowing for actuation of a control adjustment to be made earlier. Utilizing sensed tire information in conjunction with determining the lateral kinetic energy of the vehicle enables a more robust control algorithm to be designed. Also, using tire information provides a better response in a vehicle that is lightly damped (or has significantly worn dampers) as inertial sensors might not correctly identify wheel lift and could actuate the vehicle brakes in a manner that causes the vehicle to roll over. For example, the vehicle body of a lightly damped vehicle could be out of phase with the suspension (and thus the sensor information) thereby creating a response in the control system that can contradict actual behavior of the vehicle. Implementation of the rollover mitigation strategy according to the present invention can include a standard vehicle stability control system using vehicle roll rate and lateral acceleration, enhanced electronic steering control using additional sensor information, and enhanced roll mitigation functionality utilizing additional sensor information. It is anticipated that a calculated vehicle roll index and electronic steering control will have a more precise response when using the additional sensor information according to the present invention.

Figure 1:
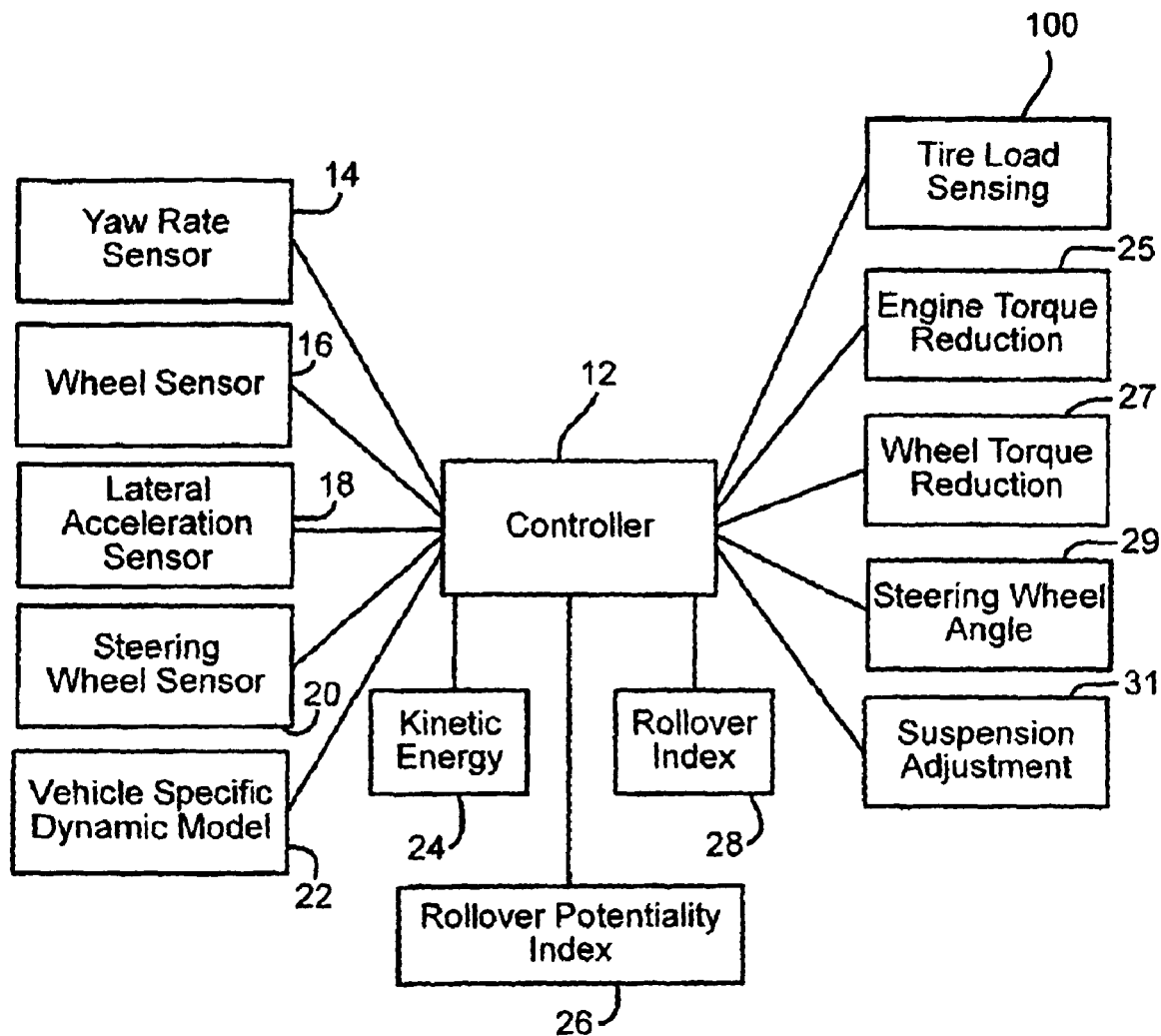
FIG. 1 illustrates a block diagram of a rollover sensing system for determining a rollover event and counteracting an actual rollover.

Referring now to the drawings and particularly to FIG. 1, there is shown a block diagram of a rollover sensing system for determining a rollover event and providing control actions to reduce the likelihood of an actual rollover. A controller 12 is coupled to a plurality of sensing devices located throughout a vehicle 10 (shown in FIG. 2) for monitoring vehicle operating parameters. The controller 12 receives signals from the plurality of sensing devices concerning the vehicle operating parameters for determining when the vehicle 10 is in a condition to potentially rollover and to provide a control action to counteract an anticipated rollover. A plurality of sensors comprises a yaw rate sensor 14 for sensing a yaw rate of the vehicle 10, a wheel sensor 16 for sensing a speed of the vehicle 10, a lateral acceleration sensor 18 for sensing a lateral acceleration (aym) 38 of the vehicle 10, and a steering wheel sensor 20 for sensing a steering wheel angle of the vehicle 10. A vehicle specific dynamic model 22 is stored in the controller's memory, or alternatively, in a separate memory storage device for providing specific vehicle characteristics when determining the occurrence of a rollover event.

After the vehicle operating parameter data is retrieved from the plurality of sensors, the controller determines a lateral kinetic energy 24 of the vehicle 10. The kinetic energy 24 and the lateral acceleration (aym) 38 are used to determine a rollover potentiality index ($\Phi_0$) 26. A rollover index ($\Phi$) 28 is thereafter determined by weighting the rollover potentiality index ($\phi_0$) 26. If the controller 12 determines rollover index ($\Phi$) 28 to be at a critical stage where an actual rollover may occur if the current vehicle operating parameters are maintained, then the controller 12 detects a rollover event and provides a control signal for taking a corrective action to counteract an actual rollover. The controller 12 provides a signal to a specific device or secondary controller for providing at least one control action to counteract the actual rollover. Control actions may comprise an engine torque reduction such as a change in the engine output 25 or an actuation of the brakes 27, a steering wheel angle adjustment 29, or a suspension adjustment 31. In a preferred embodiment, a tire load sensing mechanism 100 is included as one of the sensors included for determining a factor added to a rollover index ($\Phi$) 28. The tire load sensing mechanism 100 and the implementation thereof will be described in greater detail below.

Figure 2:
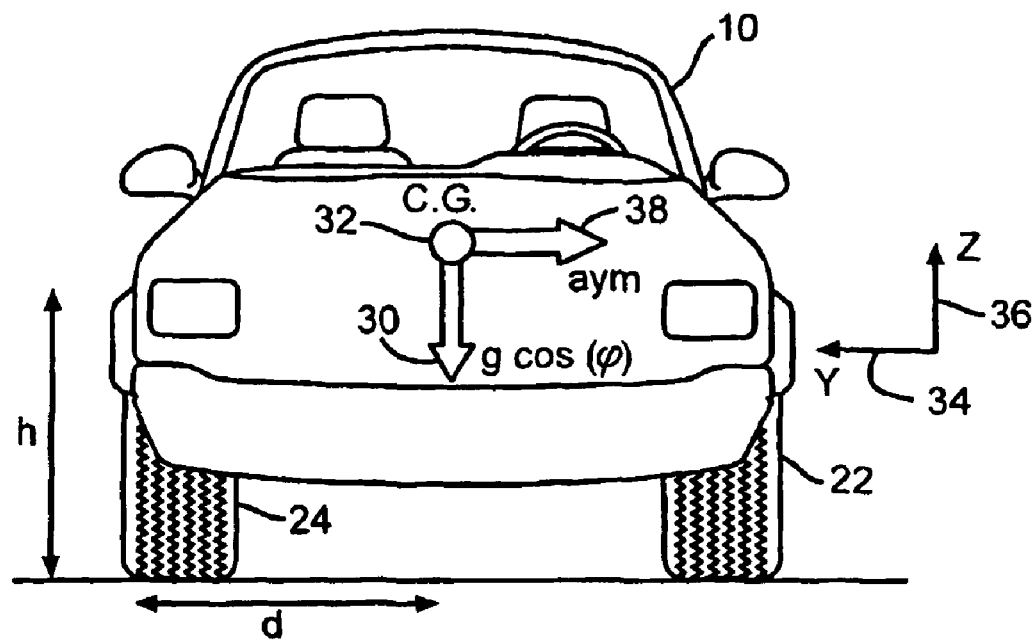
FIG. 2 illustrates a front view of a vehicle with illustrates a center of gravity sprung mass having a gravitational and lateral force exerted on the vehicle.

FIG. 2 shows a vehicle 10 having a sprung mass high center of gravity C.G. 32 such as a van or a sport utility vehicle. A y-axis 34 and a z-axis 36 represent directional planes of a vehicle sprung mass C.G. 32 while traveling along a road. The set of axes are fixed to the vehicle spring mass C.G. 32 and rotate with the vehicle spring mass C.G. 32. The vehicle 10 has a lateral acceleration (aym) 38 that is a vector force exerted by the vehicle 10 along the y-axis 34. The lateral acceleration (aym) 38 is measured by an accelerometer attached to the vehicle sprung mass C.G. and based partly on vehicle acceleration and partly on gravity. A force exerted along the Z-axis 36 is a gravitational force 30 represented by:

$$g \cos(\phi)$$

where g is a gravitational constant and $\phi$ is a roll angle of the vehicle sprung mass C.G. 32 relating to the lateral acceleration (aym) 38 and/or if present the super elevation angle of the road surface. The vehicle 10 while driving on a flat surface having a 0° roll angle would have a gravitational force 30 equal to the gravitational constant (g) since the cos 0°=1. A nominal height (h) is measured from the road to the vehicle sprung mass C.G. 32 while the half track width (d) represents the width from a tire outside edge to the vehicle sprung mass C.G 32. Nominal height (h) and half track width (d) are stored in memory as part of the vehicle specific dynamic model 22.

Figure 3:
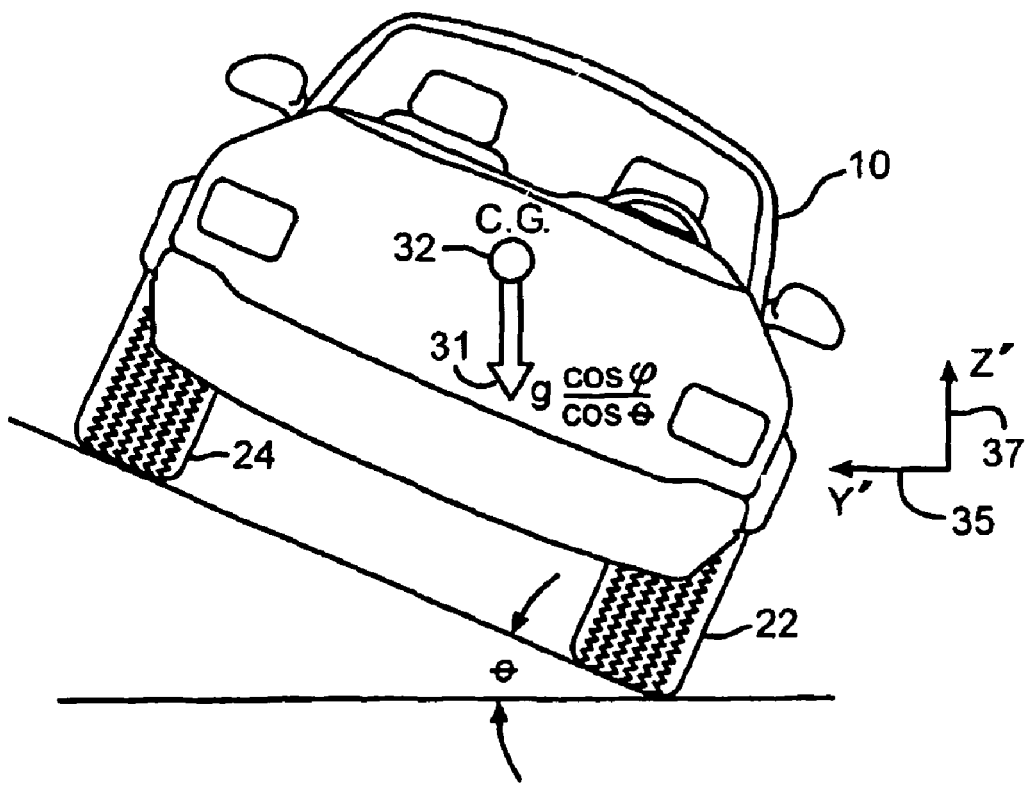
FIG. 3 illustrates the front view of the vehicle with the vehicle in a condition of imminent threat of rollover.

FIG. 3 represents the vehicle 10 having a first pair of wheels on a first side of the vehicle 10 in contact with the road surface and a second pair of wheels elevated from the road surface while the vehicle 10 is tilted from the horizontal by an angle $\theta$. A net gravitational force 31 acting on the vehicle sprung mass C.G. 32 while in the tilted position is represented by the following formula:

$$g \cos(\phi)/\cos(\theta)$$

A set of reconfigured coordinate axes are shown relating to the tilted vehicle 10. A z'-axis 37 is parallel to the net gravitational force acting on the vehicle sprung mass C.G. 32 while a y'-axis 35 of the lateral acceleration (aym) 38 is always equal to zero.

A minimum amount of potential energy required for an actual roll over is the net gravitational force times the differential in height between the nominal height in a static condition and the ultimate height of the vehicle sprung mass C.G. 32 at the verge of rollover defined by the formula:

$$(g \cos \phi / \cos \theta) * \Delta h$$

If (h) is defined as the nominal height of the vehicle sprung mass C.G. 32 while all wheels are in contact with the road surface (as shown in FIG. 2), then a current height of the vehicle sprung mass C.G. 32 may be defined by the formula:

$$d \sin(\theta) + h \cos(\theta),$$

and the ultimate height of vehicle sprung mass C.G. 32 when the vehicle 10 is at the verge of the actual roll over is defined by the formula:

$$\sqrt{d^2 + h^2}$$

Therefore, the height change ($\Delta h$) of the vehicle sprung mass C.G. 32 required for roll over is defined by the formula:

$$\Delta h = \sqrt{d^2 + h^2} - (d\sin\theta + h\cos\theta)$$

which leads to $$\Delta h = \sqrt{d^2 + h^2} - \frac{da_{ym} + hg\cos\varphi}{\sqrt{g^2\cos^2\varphi + a_{ym}^2}}$$

Since the lateral kinetic energy of the vehicle 10 can be converted to potential energy very quickly through a rolling motion, the vehicle 10 has a potential to roll over at any time if the lateral kinetic energy is greater than or equal to the minimum amount of potential energy required for actual rollover. The lateral kinetic energy is defined by the formula:

$$\frac{1}{2}V_y^2,$$

where Vy is the vehicle's lateral velocity, therefore $$\frac{1}{2}V_y^2 > \frac{g\cos\varphi}{\cos\theta}\Delta h$$

which leads to $$\frac{1}{2}V_y^2 > \sqrt{g^2\cos^2\varphi + a_{ym}^2}\,\Delta h$$

which leads to $$\frac{1}{2}V_y^2 > \sqrt{g^2\cos^2\varphi + a_{ym}^2}\,\sqrt{d^2 + h^2} - (da_{ym} + hg\cos\varphi)$$

The lateral velocity ($V_y$) can be calculated from longitudinal velocity ($V_x$) and vehicle side slip angle ($\beta$) as:

$$v_y = v_x \beta$$

The longitudinal velocity ($V_x$) is the velocity of the vehicle 10 traveling along the road and is measured by wheel speed sensors. The vehicle side slip angle ($\beta$) is determined by the controller monitoring the yaw rate, the lateral acceleration (aym) 38, the steering wheel angle, and a specific vehicle dynamic model of the vehicle 10.

A rollover potentiality index ($\Phi_0$) 26 is determined from the difference between the vehicle lateral kinetic energy and the minimum potential energy required for rollover. The rollover potentiality index ($\Phi_0$) 26 is defined by the following formula:

$$\Phi_0 = \frac{1}{2}|V_x\beta|^2 - \sqrt{g^2 + a_{ym}^2}\,\sqrt{d^2 + h^2} + da_{ym} + hg$$

In determining the rollover potentiality index ($\Phi_0$) 26 from the above inequality condition, cos φ is neglected. The objective of the rollover algorithm applied by the controller is to detect the rollover event. The rollover event is defined as a condition where corrective action is taken to counteract an actual rollover. This requires that the rollover event is identified prior to the rollover angle becoming excessive resulting in the actual rollover. In determining whether omitting the roll angle from the inequality equation results in a significant error, a roll angle φ of 25 degrees is factored into the above inequality equation where cos (25°) is equal to 0.9. The effect of neglecting cos φ on the rollover potentiality index ($\Phi_0$) 26 using φ equal to 25 degrees is less than 0.4% of the rollover potentiality index ($\phi_0$) 26. The error of 0.4% is less than the uncertainties of the vehicle parameters and the estimated vehicle side slip angle, and therefore, the roll angle φ may be neglected when determining the rollover potentiality index ($\Phi_0$) 26.

When the rollover potentiality index ($\Phi_0$) 26 is positive, the vehicle 10 has a potential to rollover. The potential to rollover increases with an increasing rollover potentiality index ($\Phi_0$) 26. However, a large rollover potentiality index ($\Phi_0$) 26 alone does not necessarily indicate that the vehicle 10 will rollover. The large kinetic energy needs to be converted to potential energy. This typically occurs when the vehicle 10 hits a high mu surface or a bump after a large side slip typically on a low mu surface. When the vehicle 10 hits a high mu surface, the lateral acceleration (aym) 38 of the vehicle 10 increases very rapidly. In the preferred embodiment, the measured lateral acceleration (aym) 38 needs to be more than 80% of statically critical lateral acceleration for roll over to occur. However, in other preferred embodiments, the measured lateral acceleration (aym) 38 may be any variable less than 100% of the statically critical lateral acceleration for roll over to occur for a respective vehicle. A statically critical lateral acceleration is defined as an acceleration required to make the vehicle 10 rollover on a flat surface which is represented by the formula:

(d/h)*g

In determining a rollover index ($\Phi$) 28 from the measured lateral acceleration (aym) 38 and the statically critical lateral acceleration, the rollover index ($\Phi$) 28 is defined by the following formula:

$$\Phi = \Phi_0 \times \left(|a_{ym}| - \frac{d}{h}g \times 0.8 > 0\right)$$

The rollover index ($\Phi$) 28 is the rollover potentiality index ($\Phi_0$) 26 weighted by the measured acceleration less the statically critical lateral acceleration. When the absolute value of the measured lateral acceleration (aym) 38 is less then 80% of the critical acceleration, the index is zero and the potential for an actual rollover is not present. When the rollover index ($\Phi$) 28 yields a positive number, the rollover index ($\Phi$) 28 will be compared against a predetermined threshold. If the rollover index ($\Phi$) 28 is above the predetermined threshold, then the controller 12 will provide a signal to take a control action to counteract the vehicle 10 from rolling over.

Figure 4:
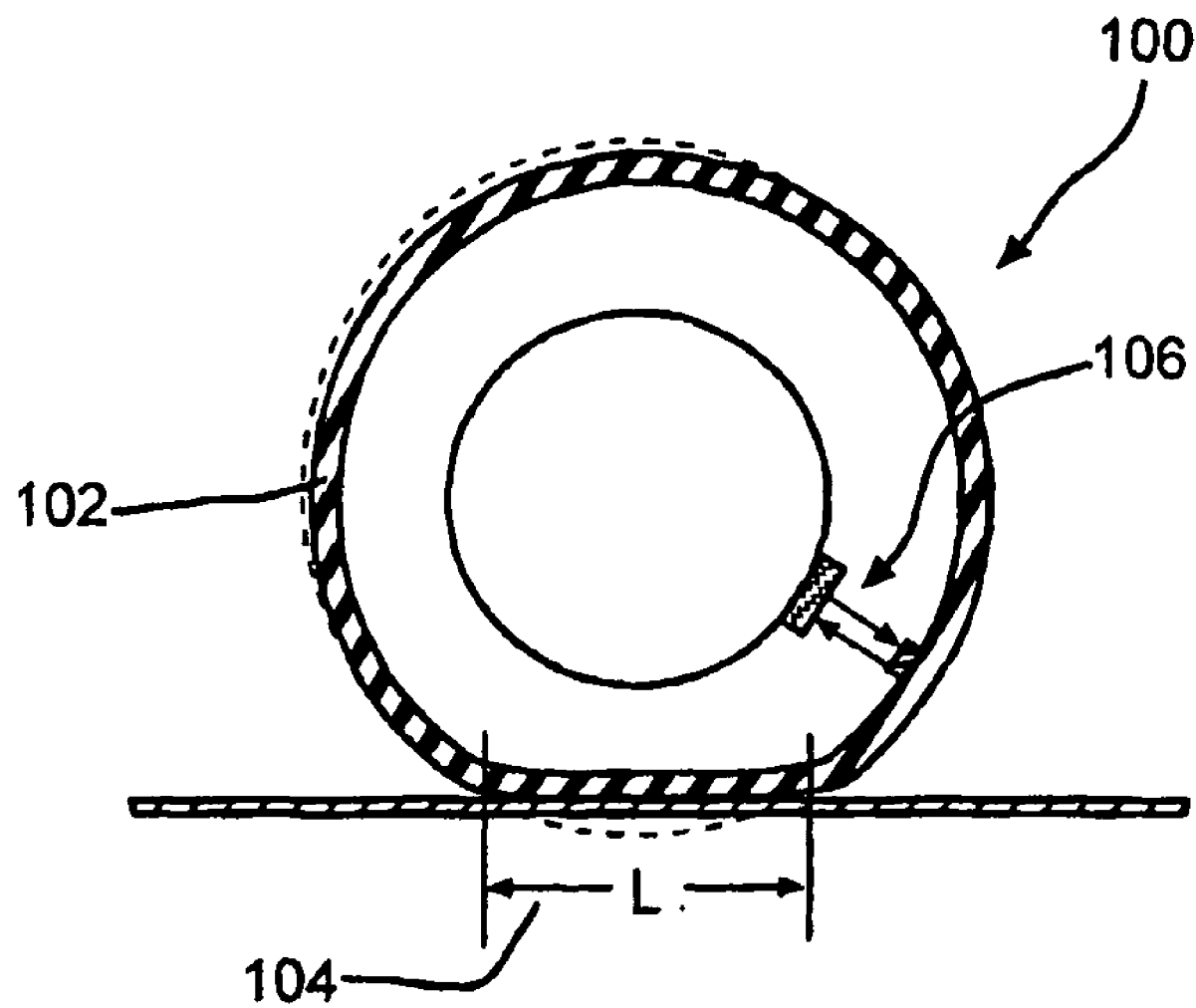
FIG. 4 illustrates a vehicle tire having an in-wheel tire sensing mechanism.
Figure 5:
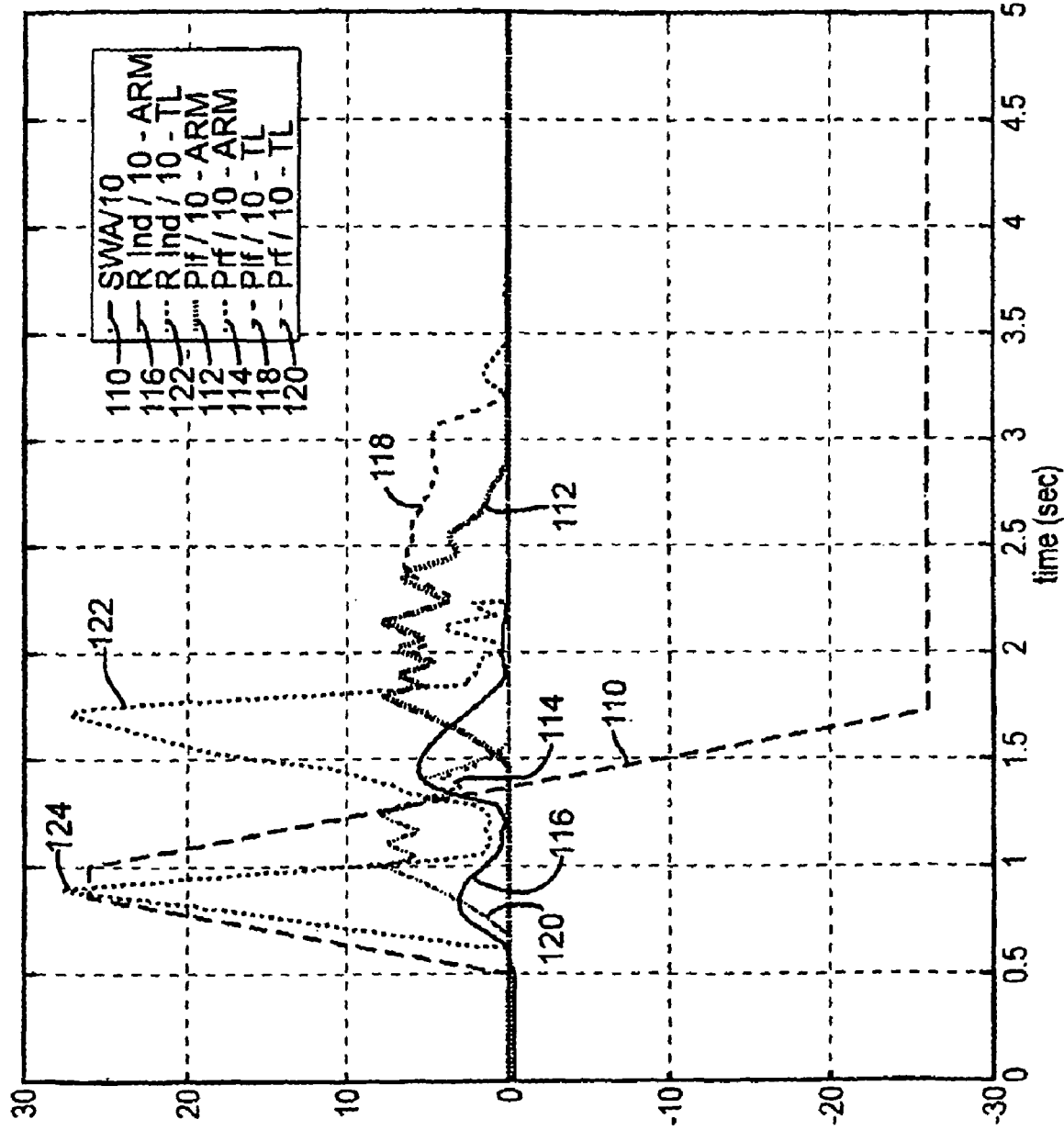
FIG. 5 illustrates a graph displaying vehicle states during a rapid steering maneuver.
Figure 6:
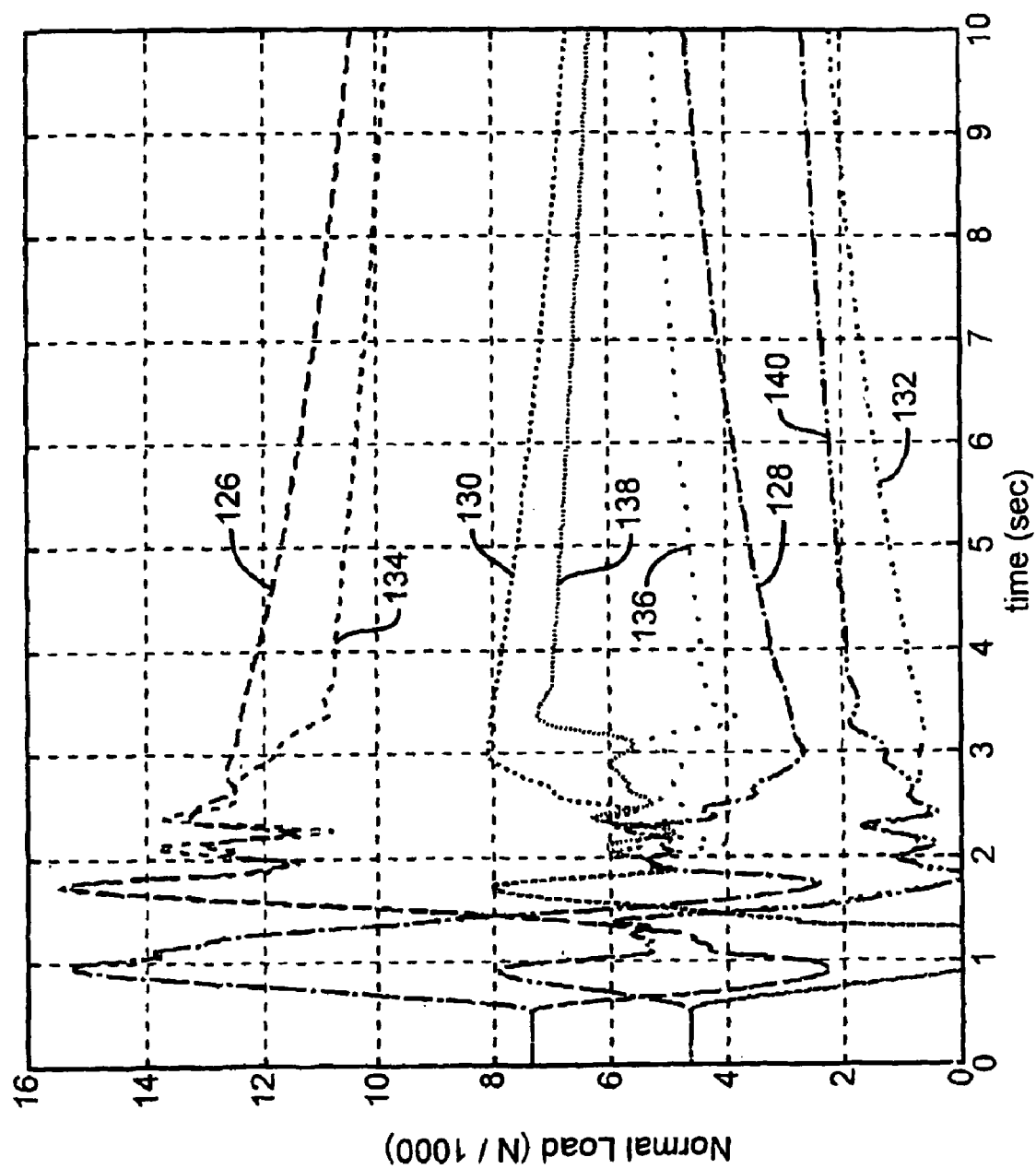
FIG. 6 illustrates a graph displaying a comparison of tire normal forces on vehicle tires.

In the '968 application, there are illustrated several graphs depicting tire normal forces, a calculated rollover index, and vehicle states during a slowly increasing steering wheel angle maneuver (See FIGS. 4-6). Also shown are several graphs depicting tire normal forces, a calculated roll index, and vehicle states during a rapid steering maneuver (See FIGS. 7-9). The assorted graphs depict how a vehicle responds over time during the described maneuvers. It is anticipated that there would be a similar vehicle response under those same maneuvers for the purposes of determining the potential of a vehicle to have a rollover event in a vehicle that does not implement the vehicle rollover mitigation strategy according to the present invention. However, a vehicle implementing the rollover mitigation strategy according to the present invention will have a different response when the mitigation strategy is implemented, as will be described below.

In the preferred embodiment, tire force sensor information is factored into the rollover index ($\Phi$) 28 equation. There is illustrated in FIG. 4 a vehicle tire 102 that is under a load that could be caused by a lateral acceleration and other dynamic vehicle factors, such as those described above. The illustrated vehicle tire 102 includes a tire load sensing mechanism 100. The tire load sensing mechanism 100 can be any suitable sensing mechanism that is capable of estimating or measuring a tire force. One method of quantifying this force can be by measuring the length, L, of a contact patch 104 of the tire 102, and measuring changes to the contact patch 104 length. A contact patch 104 can be defined as the surface of the tire 102 that is in contact with the ground surface. One example of a sensor that can be used with the present invention is described in pending U.S. patent application Ser. No. 10/678,537 filed Oct. 3, 2003, the disclosures of which are incorporated herein by reference (hereinafter the '537 application). As described therein, the approach used in the '537 application for the detection of the deflection region of a loaded tire is to sense the acceleration of the rotating tire by means of the accelerometer 106 of the detector mounted on the tire 102. The accelerometer 106 can be used to measure both or either radial and tangential acceleration. The detector is preferably positioned on the interior surface of the tire 102 and more preferably on the inner tread lining of the tire 102. As the tire 102 rotates and the accelerometer 106 is off the flat deflection region, a high centripetal acceleration is sensed. Conversely, when the accelerometer is on the flat deflection region and not rotating, a low acceleration is sensed. The deflection points are determined at the points where the acceleration transitions between the high and low values, thereby defining the length, L, of the contact patch 104. It should be appreciated that any other method and mechanism for detecting the contact patch 104 length can be used without departing from the scope of the present invention. Particularly, the length, L, of the contact patch 104 can be quantified by a pressure sensing mechanism, temperature sensing mechanism or any combination of these sensing mechanisms. It is preferred that a tire load sensing mechanism 100 is used with respect to each vehicle tire 102. That way, the tire load, and differences between tire loads at each position where the vehicle is in contact with the ground surface, can be more accurately detected. It should also be appreciated that any other force sensing mechanism (or contact patch measuring system) can also be used with the present invention to supply the desired tire load information.

The use of tire load being added to the rollover index ($\Phi$) 28 described above is to increase the performance and response of the rollover mitigation strategy in several areas. Particularly, there can be an increased detection of shifts to the vehicle center of gravity that can be due to loading variations in the vehicle. Additionally, an efficiency can be achieved by utilizing a similar control program for various vehicle types, since the tire load factor will automatically tailor the vehicle response to the particular loading characteristics of the vehicles in which the tire load sensing mechanism 100 is installed. A tire load sensing mechanism 100 also provides the advantages of constantly monitoring, measuring, and adjusting to road surface conditions. Similarly, the tire load sensing mechanism 100 can adjust the overall system response due to the tire size and tire type that is installed on the vehicle. Another advantage gained by using a tire load sensing mechanism 100 to determine the rollover index ($\Phi$) 28 is that each tire 102 would be affected by actuation and brake load variation during operation of the vehicle. Thus, a rollover index ($\Phi$) 28 that includes tire load sensing can adjust for those continuously changing factors on each of the tires while detecting a rollover event.

As implemented, the tire load sensing mechanism 100 preferably determines the measured tire normal load. It can be appreciated that the tire load could also be implicitly estimated from a tire based measurement. A function of the sensed tire load is added to the rollover index ($\Phi$) 28. The additional factor of the sensed tire load provides a further control lead for identifying a wheel lift condition. That is, the tire load factor information allows the controller to determine more quickly, and more in advance of, a wheel lift condition. The force implementation function is adapted so that the measured force values are processed so that the overall rollover index ($\Phi$) 28 causes a control action with a larger command and greater phase lead. This allows the control actuation to occur at a more precise time.

In FIG. 5 there is illustrated a graph depicting vehicle states during a rapid steering maneuver. However, contrary to the graphs described above from the '968 application, in FIG. 5 one of the vehicle responses is shown being based on the implementation of the rollover mitigation strategy according to the present invention. The steering wheel angle is represented by line 110. The rapid steering maneuver is indicative of the vehicle 10 making a sharp turn to the left (which causes an increase in the normal force on the right side tires and causes wheel lift on the left side tires) and then making a sharp turn to the right (which causes an increase in the normal force on the left side tires and causes wheel lift on the right side tires). A change in steering wheel angle 110 would cause a vehicle maneuver, or turn, known in the art as a "fish hook" to occur. Also in FIG. 5 there is illustrated a tire brake pressure applied to a left front tire and a right front tire of a vehicle 10 represented by lines 112 and 114, respectively. Also shown is a rollover index that is determined using a rollover mitigation strategy that implements data from inertial sensors (active rollover management—ARM). This rollover index is represented by line 116. The graph of the rollover index 116 in FIG. 5 indicates that a control action occurs at a point between 0.5 seconds and 1.0 seconds. The rollover index increases to a point between 0 and 10 units. When the steering wheel angle 110 is redirected from the left to the right, the rollover index 116 returns to approximately zero. When the steering wheel angle 110 again approaches a maximum level, the rollover index 116 again increases to a slightly greater point between 0 and 10 units before returning to about zero.

The applied brake pressure on a left front tire and a right front tire of the vehicle 10 are also represented in FIG. 5 and are indicated by lines 118 and 120, respectively, using the tire force sensors according to the present invention and that were described above. A calculated rollover index is also illustrated in FIG. 5 by line 122. The graph of the rollover index 122 in FIG. 5 indicates that a control action occurs at approximately 0.5 seconds. Therefore, it is clearly shown that the rollover index 122 begins to increase at a time that is earlier than the rollover index 116 described above. As can also be seen, the rollover index 122 has a greater magnitude and reaches an apex 124 more quickly than the rollover index 116 that only uses inertial sensors. Thus, a controller 12 can take a control action to prevent a rollover event from occurring more effectively. The rollover index increases to a point between 20 and 30 units. When the steering wheel angle 110 is redirected from the left to the right, the rollover index 122 returns to a point above zero, thereby remaining more responsive to any forces acting on the vehicle tires, whereas the rollover index 116 returns to almost zero. When the steering wheel angle 110 approaches its maximum level in the opposite direction, the rollover index 122 again increases to a point between 20 and 30 units before returning to about zero. It can be seen again that the rollover index 122 responds at a point earlier than that of the rollover index 116. Additionally, it can further be seen that the rollover index 122 remains active longer than the rollover index 116 thereby remaining more responsive to the state of the vehicle. This is further illustrated by line 118 which indicates that a braking pressure is continued to be applied to the left front tire in a greater amount and for a longer duration than that being applied to the left front tire (braking pressure 112) under an active rollover management scheme.

There is illustrated in FIG. 6 a graph showing vehicle tire normal loads on four tires of a vehicle during a vehicle maneuver, such as was described above. A representation of the tire loads is shown for a vehicle using an active rollover management (ARM) strategy, as well as for a vehicle implementing the rollover mitigation strategy according to the present invention. In FIG. 6, the ARM tire normal loads are indicated as follows: left front tire 126, right front tire 128, left rear tire 130, and right rear tire 132. The tire normal loads experienced in a vehicle using the rollover mitigation strategy according to the present invention are also represented in FIG. 6 and are indicated as follows: left front tire 134, right front tire 136, left rear tire 138, and right rear tire 140. During a vehicle maneuver such as was described above with respect to FIG. 5, the tire loading would be substantially as shown in FIG. 6. What the graph of FIG. 6 shows is that as the vehicle initially turns to the left, the tire normal loads on the left side tires decrease and the loads on the right side tires increase. As the vehicle subsequently turns to the right, the tire normal loads on the right side tires decrease and the loads on the left side tires increase. As shown in FIG. 6, the initial tire normal loads indicate that a front end of the vehicle is loaded at approximately 7,500 Newton and a rear end of the vehicle is loaded at approximately 4,500 Newton. As the vehicle moves through the maneuver as shown in FIG. 5, and as the rollover index increases to a point where there is a higher potentiality for a rollover, the rollover mitigation scheme according to the present invention maintains a greater tire normal load than does the ARM scheme. With a greater tire normal load maintained, on the tires, there is a greater amount of vehicle control that can be maintained. That is, the tires have greater contact with the surface of travel when there is a higher tire normal load. As is illustrated in FIG. 6, the mitigation scheme according to the present invention utilizes the control actuation to return the tires more closely to their initial normal loads and more quickly than the ARM scheme.

Figure 7:
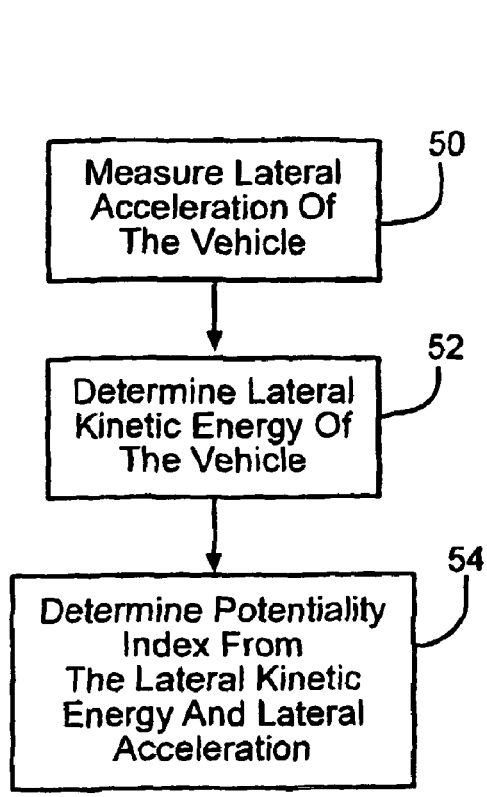
FIG. 7 illustrates a method for estimating the propensity of a vehicle to rollover.

FIG. 7 illustrates a method for estimating a propensity of a vehicle 10 to rollover. In step 50, the lateral acceleration is measured using a sensor such as an accelerometer. In step 52, the lateral kinetic energy of the vehicle is determined. The lateral kinetic energy is derived from the vehicle longitudinal velocity and the vehicle side slip angle. The vehicle longitudinal velocity is the speed of the vehicle 10 traveling along the road and may be measured from a vehicle wheel in contact with the surface of the road. The vehicle side slip angle is determined by the controller in response to retrieved from a plurality of sensing devices throughout the vehicle for providing data on the yaw rate, the steering wheel angle, the lateral acceleration, and data from a dynamic model of the vehicle. In step 54, the rollover potentiality index is determined in response to the data derived in step 50 and 52. The rollover potentiality index provides the difference between the lateral kinetic energy and the minimum potential energy required for rollover.

Figure 8:
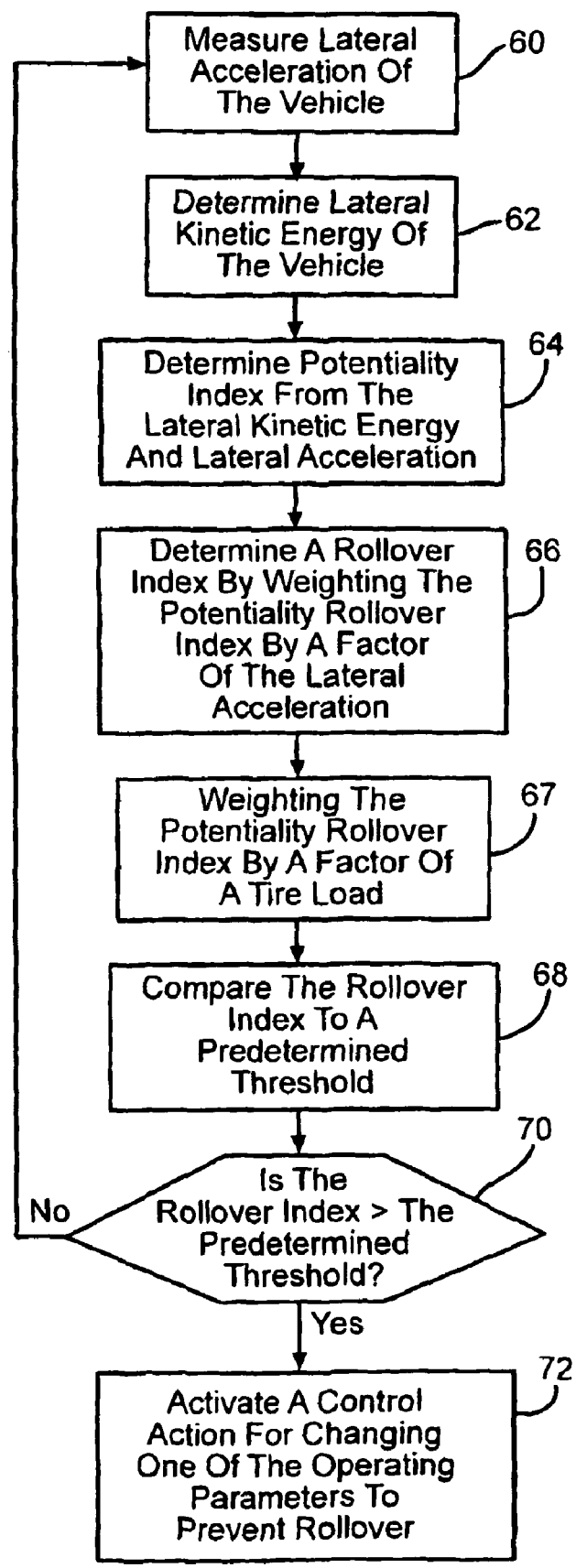
FIG. 8 illustrates a method for detecting a rollover event and providing corrective actions to avoid an actual rollover.

FIG. 8 illustrates a method for estimating a rollover event of a vehicle where the rollover event is defined as a moment when a corrective action is taken to counteract an actual rollover. In step 60, the lateral kinetic energy of the vehicle is determined from the vehicle longitudinal velocity and the vehicle side slip angle. In step 62, the lateral acceleration is measured from a sensing device such as an accelerometer. A rollover potentiality index is then determined from the lateral kinetic energy and the lateral acceleration in step 64. The rollover potentiality index provides the difference between the lateral kinetic energy and the minimum potential energy required for rollover. In step 66, a rollover index is determined by weighting the rollover potentiality index by a factor of the lateral acceleration. The weighting factor is derived from a difference in the measured lateral acceleration less a percentage of the statically critical lateral acceleration required for rollover to occur. In step 67, the potentiality rollover index is weighted by a factor of the tire load. The factor is a function of the tire load as described above. In step 68, the rollover index is compared to a predetermined threshold. In step 70, a determination is made whether the rollover index is greater than the predetermined threshold. If a determination is made that the rollover index is less than the predetermined threshold, a return is made to step 60 to retrieve data regarding operating parameters to determine if changes have occurred to the kinetic energy and lateral acceleration of the vehicle. If a determination is made is step 70 that the rollover index is greater than or equal to the predetermined threshold, the controller activates a control action for changing at least one of the operating parameters for counteracting the anticipated rollover in step 72.

The principle and mode of operation of this invention has been explained and illustrated in its preferred embodiment. However, it must be understood that this invention may be practiced otherwise than as specifically explained and illustrated without departing from its spirit or scope.

What is claimed is:

1. A method for detecting a potential for a vehicle rollover event, the method comprising the steps of:
   determining a lateral kinetic energy of the vehicle based on vehicle longitudinal velocity and vehicle side slip angle;
   measuring a lateral acceleration of the vehicle;
   measuring a tire load;
   determining a rollover potentiality index based on the lateral kinetic energy and the lateral acceleration;
   determining a rollover index by weighting the rollover potentiality index by a factor of the lateral acceleration and a factor of the tire load;
   determining if the rollover index is above a predetermined threshold; and
   outputting an indication based on the above-determined indexes to a controller adapted to provide a control action in response thereto;
   wherein the measured tire load, which is used in determining the rollover index, is determined by measuring a length of a contact patch of a vehicle tire and measuring changes to the contact patch length and;
   further comprising the step of providing a control signal from a controller configured to output a control signal to a system of the vehicle to implement corrective action to reduce the potential of an actual rollover when the rollover index is above a predetermined threshold.

2. The method defined in claim 1 wherein the measured tire load, which is used in determining the rollover index, is a tire normal load.

3. The method defined in claim 1 wherein the length of the contact patch is quantified by at least one of an accelerometer, a pressure sensing mechanism, and a temperature sensing mechanism.

4. The method defined in claim 1 wherein the lateral acceleration of the vehicle is sensed using a lateral acceleration sensor;
   the method further comprising sensing a yaw rate of the vehicle, sensing a speed of the vehicle, sensing a steering wheel angle of the vehicle, and factoring the speed of the vehicle and the steering wheel angle of the vehicle into the rollover index determination.

5. The method defined in claim 1 wherein the corrective action includes at least one of engine torque reduction, a steering wheel angle adjustment, and a suspension adjustment.

6. The method defined in claim 5 wherein the engine torque reduction includes at least one of a change in engine output and actuation of vehicle brakes.

7. The method defined in claim 1 wherein the lateral acceleration of the vehicle is measured by an accelerometer attached to a center of gravity of the vehicle.

8. An apparatus for detecting a rollover event for a vehicle comprising:

a lateral acceleration sensor for sensing a lateral acceleration of the vehicle;

a yaw rate sensor for sensing a yaw rate of the vehicle;

a sensor for sensing the speed of the vehicle;

a steering wheel sensor for sensing a steering wheel angle of the vehicle;

a tire load sensing mechanism for measuring a tire load; and a controller configured to factor the speed of the vehicle and the steering wheel angle of the vehicle into the rollover index determination defined in claim 1.

* * * * *